(12) United States Patent
Yamaguchi et al.

(10) Patent No.: US 8,902,430 B2
(45) Date of Patent: Dec. 2, 2014

(54) MEASURING APPARATUS AND EXPOSURE DEVICE

(75) Inventors: Wataru Yamaguchi, Utsunomiya (JP); Ryo Sasaki, Utsunomiya (JP); Takahiro Matsumoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 13/007,006

(22) Filed: Jan. 14, 2011

(65) Prior Publication Data

US 2011/0176139 A1 Jul. 21, 2011

(30) Foreign Application Priority Data

Jan. 16, 2010 (JP) .................................. 2010-007612

(51) Int. Cl.
*G01B 9/02* (2006.01)

(52) U.S. Cl.
CPC ........ *G01B 9/02044* (2013.01); *G01B 2290/70* (2013.01); *G01B 9/02022* (2013.01); *G01B 9/0209* (2013.01); *G01B 2290/35* (2013.01)
USPC ........................................................ 356/456

(58) Field of Classification Search
CPC ............. G01B 9/02022; G01B 9/0209; G01B 9/02091; G01B 2290/15; G03F 9/7034; G03F 9/7026; G03F 7/70358; G02B 5/12; G02B 5/122; G02B 5/124
USPC .......... 356/508–511, 624, 450, 456; 250/548; 359/529–530
See application file for complete search history.

(56) References Cited

U.S. PATENT DOCUMENTS

| 6,249,351 | B1 | 6/2001 | De Groot |
| 7,812,959 | B1 * | 10/2010 | Kim ............................. 356/458 |
| 2007/0086013 | A1 | 4/2007 | De Laga |
| 2009/0219499 | A1 | 9/2009 | Yamaguchi |

FOREIGN PATENT DOCUMENTS

| JP | 7-104647 A | 4/1995 |
| JP | 08-035883 A | 2/1996 |
| JP | 2000-018918 A | 1/2000 |

(Continued)

OTHER PUBLICATIONS

Colomb et al. (Several micron range measurements with sub-nanometric resolution by the use of dual-wavelength digital holography and vertical scanning); 2009; Proc. of SPIE vol. 7389.*

*Primary Examiner* — Michael A Lyons
*Assistant Examiner* — Rufus Phillips
(74) *Attorney, Agent, or Firm* — Canon USA, Inc. IP Division

(57) ABSTRACT

An apparatus includes a system configured to split a light emitted from a light source into reference light and subject light, cause the subject light to enter into an object, and combine the subject light reflected by the object with the reference light, a detection unit configured to detect coherent light between the combined subject and reference lights, an element, provided within a light path of the reference light or the subject light, configured to change a path length difference between the reference light and the subject light and a relative position between the reference light and the subject light in a light receiving surface of the detection unit, and a position-variable mechanism configured to cause a position of the optical element to be changeable, wherein, by changing a position of the element, the optical path length difference and the relative position are independently adjusted.

12 Claims, 11 Drawing Sheets

(56) References Cited

FOREIGN PATENT DOCUMENTS

| JP | 2003-232606 A | 8/2003 |
| JP | 2006-258557 A | 9/2006 |
| JP | 2007/066687 A1 | 6/2007 |
| JP | 2009-204512 A | 9/2009 |
| JP | 2009-216531 A | 9/2009 |

* cited by examiner

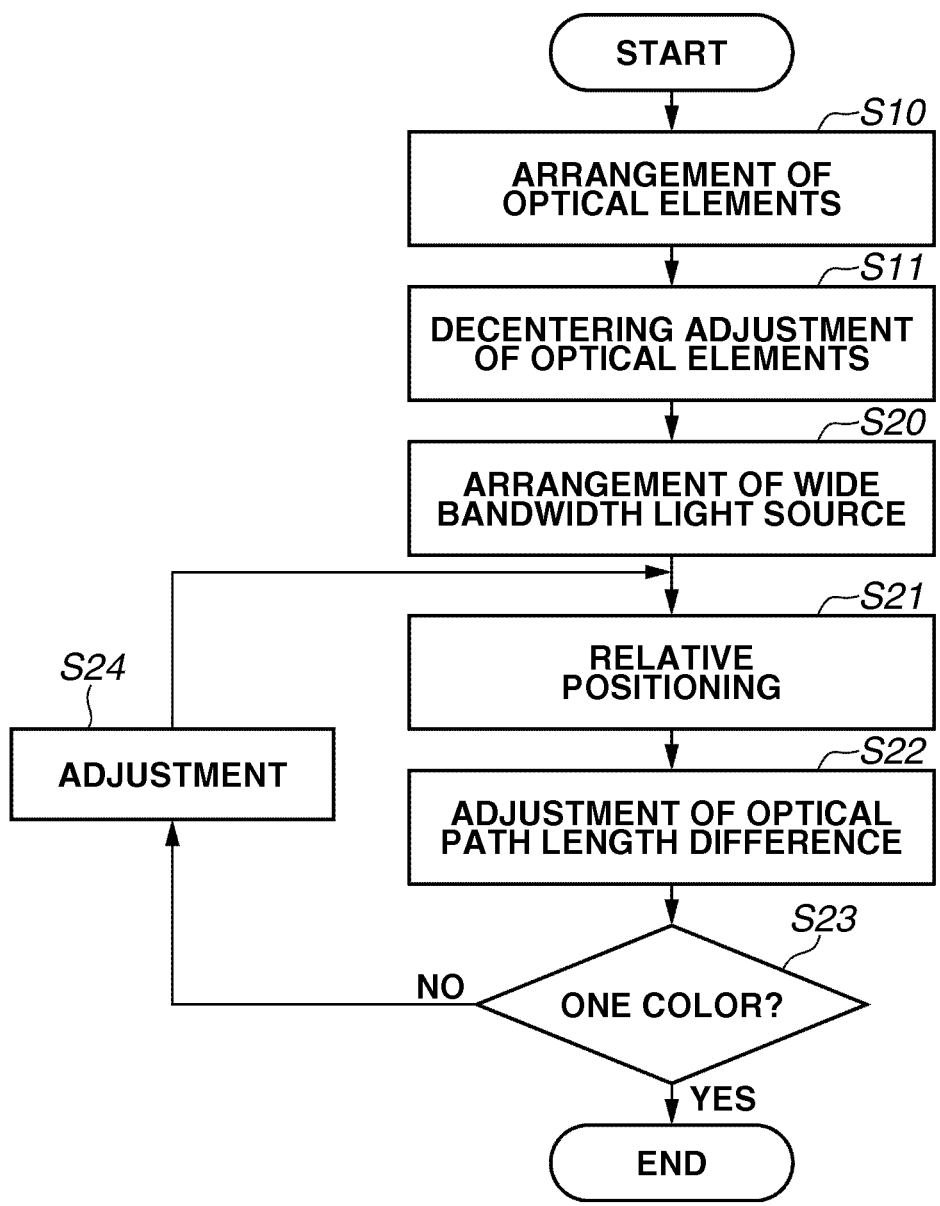

$Z=-Z_0$      $Z=0$      $Z=Z_0$

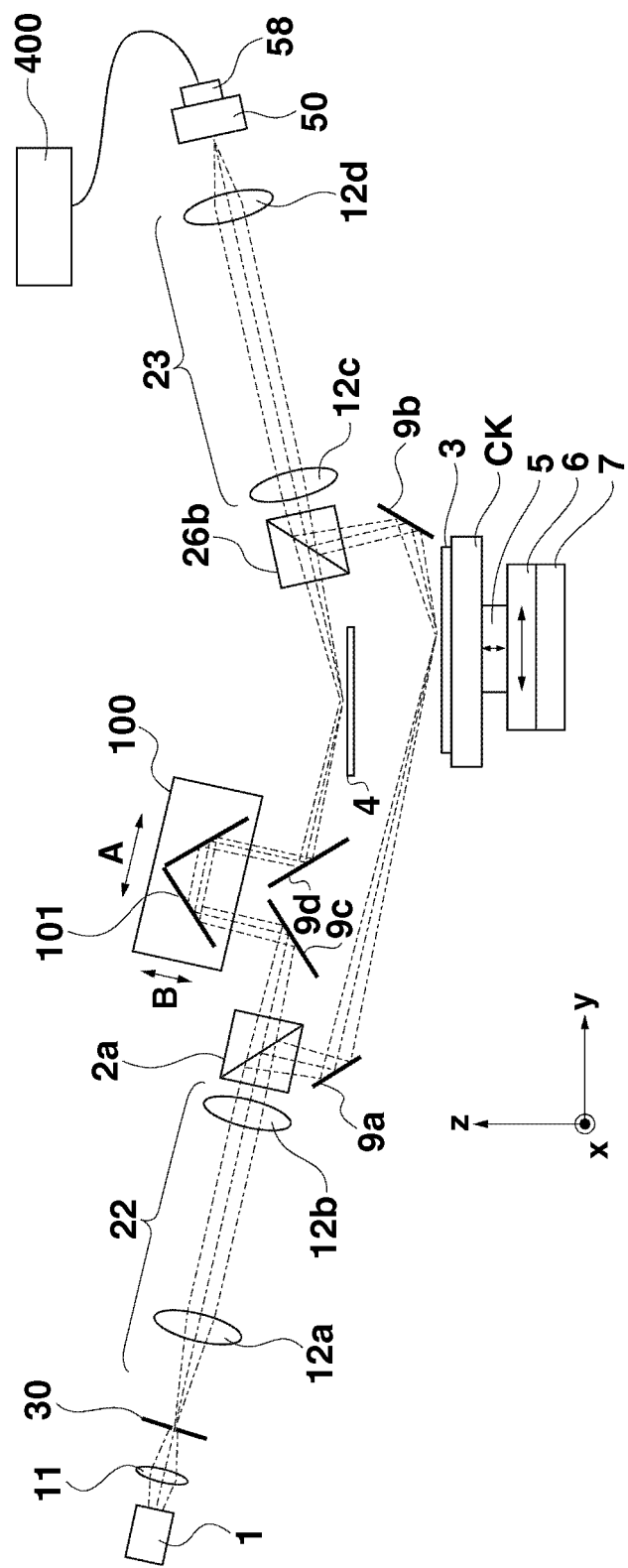

MEASURING APPARATUS AND EXPOSURE DEVICE

BACKGROUND OF THE INVENTION

1. Field of the Invention

The present invention relates to a measuring apparatus and an exposure device.

2. Description of the Related Art

A surface position measuring apparatus for detecting a position of a front surface of a substrate is described by an example of an exposure device.

An exposure device projects a circuit pattern drawn on a reticle (i.e., a mask) onto a wafer or the like using a projection optical system, thereby transferring the circuit pattern on the wafer or the like. In a step-and-scan type exposure device (i.e., a scanner), the reticle and the wafer are relatively scanned such that an exposed area has a square slit shape and a substrate is exposed to light. In the scanner, while exposing the wafer to light, a position of a surface of a region, that is not presently exposed to light but is exposed to light later, is measured. By using the measurement result, when the region is exposed to light, the position of the surface of the region is corrected so as to be matched to an optimum exposed and image-forming position. Specifically, in a lengthwise direction of an exposure slit (i.e., a direction vertical to the scanning direction), there are a plurality of measurement points in the exposure slit region in order to measure not only a height (i.e., focus) of the position of the front surface of the wafer but also a inclination (i.e., tilt) of the front surface of the wafer.

U.S. Pat. No. 6,249,351 and US Patent Application Publication No. 2007-0086013 discuss an example of a method for measuring the focus and the tilt using an optical sensor. In the measuring apparatus discussed in the U.S. Pat. No. 6,249,351, white light from a light source is split into two light fluxes using a beam splitter and then the split light fluxes obliquely enter the subject surface and a reference surface, respectively. Subsequently, the subject light and the reference light reflected by the subject surface and a reference surface, respectively, are superimposed using the beam splitter and thereafter, a peak position is detected with respect to a white light interference signal acquired by an image sensor and measure the position of the front surface of the detection object.

As details are described below, Japanese Patent Laid-open Publication No. 07-104647 discusses an example of a typical adjustment of a light path of each of the reference light and the subject light in which an adjustment unit including mirrors and prisms are used.

In the measuring apparatus discussed in the U.S. Pat. No. 6,249,351 and US Patent Application Publication No. 2007-0086013, white light having low coherence is used. Accordingly, in a case where shifting occurs in a relative position between the reference light and the subject light on the light receiving surface of the sensor (i.e., a cross section of an optical axis of the light flux) or in a case where an optical path length of the reference light differs from that of the subject light, a measurement accuracy is degraded. This is because, a contrast of coherent light (i.e., a detected signal of the sensor) is degraded or symmetry of the coherent light collapses. Therefore, adjusting both of the relative position between the reference light and the subject light and an optical path length difference therebetween in an optical axis direction is material.

In the oblique-incidence type interferometer discussed in the specification of the U.S. Pat. No. 6,249,351, adjustment is performed such that the detection object and a reference mirrors are scanned in a Z direction in order to adjust the relative position between the reference light and the subject light and the optical path length difference therebetween. However, both of the relative position between the reference light and the subject light and the optical path length difference therebetween change according to the scanning of the detection object and the reference mirrors in the Z direction, so that, if one of the relative position and the optical path length difference is adjusted, shifting occurs in the other one. Therefore, it is hard to accurately adjust both of the relative position and the optical path length difference at the same time.

In the interferometer discussed in the specification of the US Patent Application Publication No. 2007-0086013, a plurality of mirrors are scanned in a direction vertical to a surface, thereby adjusting the optical path length difference between the reference light and the subject light. However, in a case where the plurality of mirrors is scanned, both of the relative position between the reference light and the subject light and optical path length difference therebetween change concurrently. Accordingly, if the optical path length difference between the reference light and the subject light are adjusted, shifting occurs in the relative position. Therefore, accurate adjustment of both of the above is difficult.

A hologram forming apparatus discussed in the Japanese Patent Laid-open No. 07-104647 includes an optical path length adjustment unit including two pairs of combined mirrors having angles of aperture of 90 degrees and 270 degrees, respectively. In the optical path length adjustment unit, by adjusting a relative distance between the two pairs of combined mirrors, only the optical path length difference is adjusted. More specifically, adjustment of the relative position between the reference light and the subject light is not discussed therein.

SUMMARY OF THE INVENTION

According to an aspect of the present invention, an apparatus includes a system configured to split a light emitted from a light source into reference light and subject light, cause the subject light to enter into an object, and combine the subject light reflected by the object with the reference light, a detection unit configured to detect coherent light between the combined subject and reference lights, an element, provided within a light path of the reference light or the subject light, configured to change a path length difference between the reference light and the subject light and a relative position between the reference light and the subject light in a light receiving surface of the detection unit, and a position-variable mechanism configured to cause a position of the element to be changeable, wherein, by changing a position of the element using the position-variable mechanism, the optical path length difference and the relative position are independently adjusted.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flow chart of an adjustment method of the surface position measuring apparatus.

FIG. 9 illustrates a modified example of the surface position measuring apparatus.

DESCRIPTION OF THE EMBODIMENTS

Various exemplary embodiments, features, and aspects of the invention will be described in detail below with reference to the drawings.

White light and light from a white light source according to the following exemplary embodiment means light of a wide bandwidth wavelength and is not necessarily limited to light within a visible region (i.e., a region between 400 nm and 800 nm). Therefore, the present invention can be applied to, for example, an optical coherence tomography (OCT) using light of near infrared wavelength bandwidth (e.g., light of Super Luminescent Diode (SLD)).

Figure 1:
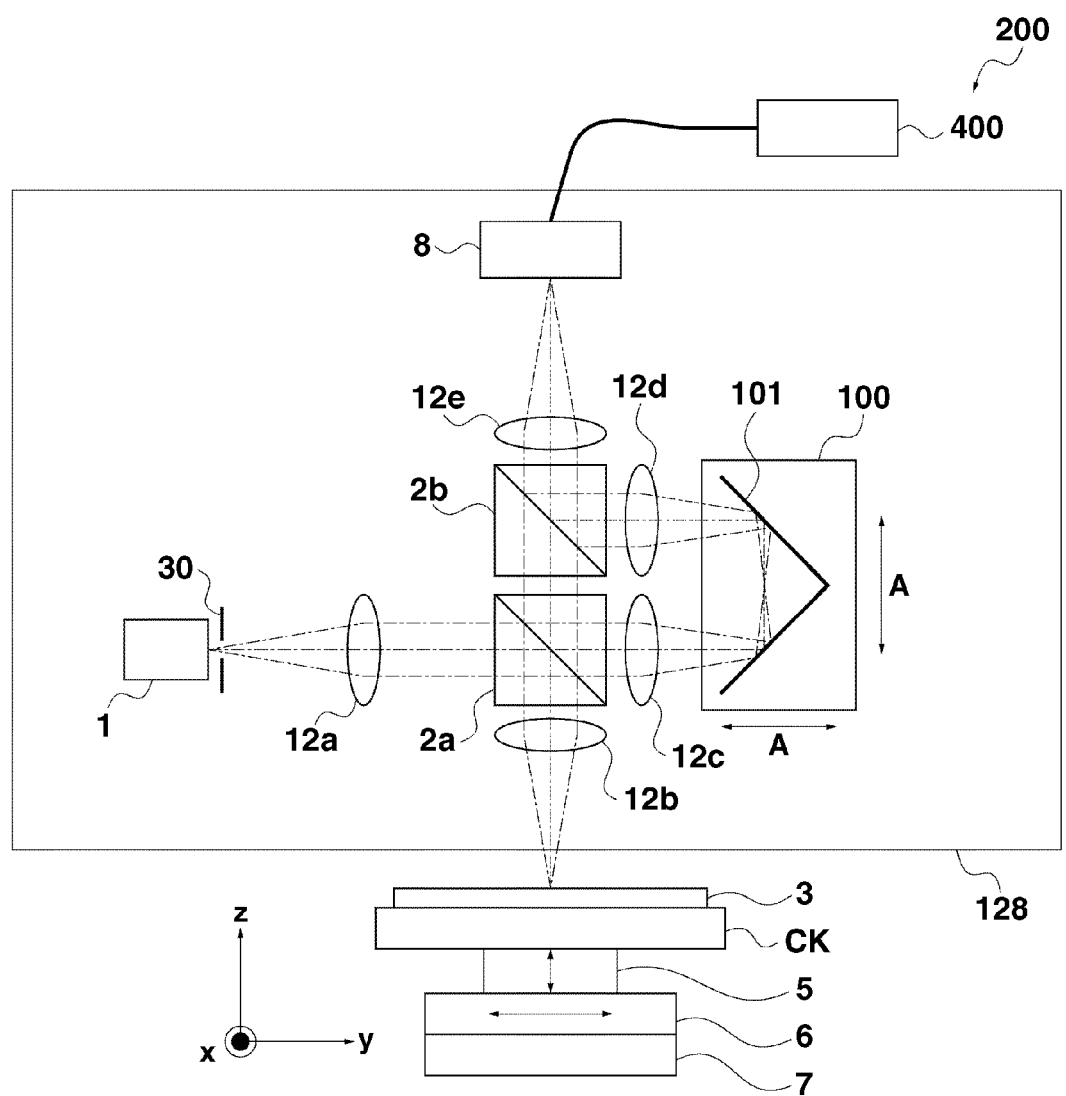
FIG. 1 is a schematic view of a surface position measuring apparatus according to a first exemplary embodiment.

A first exemplary embodiment of the present invention is described below. FIG. 1 is a plan view schematically illustrating a configuration of a surface position measuring apparatus 200 as an aspect of the present invention. The surface position measuring apparatus 200 detects a position of a substrate 3 as a detection object in a height direction (i.e., a Z direction). The present apparatus includes a light source 1, e.g., a halogen lamp or a Light Emitting Diode (LED) (including a white LED), a transmission slit plate 30, beam splitter 2a and 2b, lenses 12, a position-variable mechanism 100, and an image sensor 8. The lenses 12 include 5 pieces of lenses 12a, 12b, 12c, 12d, and 12e as illustrated in FIG. 1. Optical elements other than the substrate 3, a substrate chuck CK, stages 5, 6, and 7 are fixed on a base 128.

A preferable wavelength bandwidth of the light source 1 is a range between 400 nm and 800 nm. The wavelength bandwidth is not limited to the above range but the preferable wavelength bandwidth is a value equal to or more than 100 nm. In a case where a resist is formed on the substrate 3, it is preferable that light having wavelength equal to or less than the ultraviolet light (i.e., a value equal to or less than 350 nm) is not irradiated onto the substrate 3 for the purpose of preventing exposure of the resist to the light.

The light from the light source 1 passes through the transmission slit plate 30, is split into two fluxes of light having approximately half the light intensity of the light from the light source 1 at the beam splitter 2a, and enters into the substrate 3 and the position-variable mechanism 100, respectively, at a right angle.

The transmission slit plate 30 is preferably arranged for the purpose of securing the light intensity and shielding of stray light, and defining measurement range. The transmission slit plate 30 desirably is an illumination area having a shape of, for example, a square shape, an arc shape, or a hexagon shape.

A slit image (e.g., the illumination area having the square shape, the arc shape, or the hexagon shape) is illuminated onto the substrate 3.

The beam splitter 2a may be a cube shaped beam splitter having a split film such as a metal film and a dielectric multilayer or a pellicle type beam splitter including a thin film having a thickness of about between 1 μm and 10 μm (e.g. made of SiC or SiN). Among light split by the beam splitter 2a, the subject light is irradiated onto the substrate 3 and reflected by the substrate 3. Then, the subject light enters into the beam splitter 2b. On the other hand, the reference light is folded by a reflection mirror 101 arranged within the light path of the reference light. Then, the reference light enters into the beam splitter 2b.

The reflection mirror 101 includes, for example, two pieces of mirrors which are combined each other so as to have an angle of aperture 90 degrees and 270 degrees. Therefore, light that enters into the reflection mirror 101 at an angle of incidence of 45 degrees is reflected twice and irradiated along an axis in parallel with an incident optical axis. The reflection mirror 101 may include a member such as a retro-reflector or a rectangular prism type reflector which has a function identical to the above described exemplary embodiment.

The subject light reflected by the substrate 3 and the reference light folded by the reflection mirror 101 are combined at the beam splitter 2b and received by a light receiving surface of the image sensor 8 as a detector. At the beam splitter 2b, the subject light reflected by a surface of the substrate 3 and the reference light folded by the reflection mirror 101 are superimposed on each other to cause interference of light. Therefore, coherent light between the reference light and the subject light is detected on the light receiving surface of an image sensor 8. The beam splitter 2b may have the same configuration as that of the beam splitter 2a.

In the present exemplary embodiment, using the position-variable mechanism 100 holding the reflection mirror 101 such that a position of the reflection mirror 101 can be varied, a relative position between the reference light and the subject light on the light receiving surface and an optical path length difference between the reference light and the subject light in an optical axis direction are changed. A configuration of the position-variable mechanism 100 is described below with reference to FIGS. 2A and 2B.

Figure 2A:
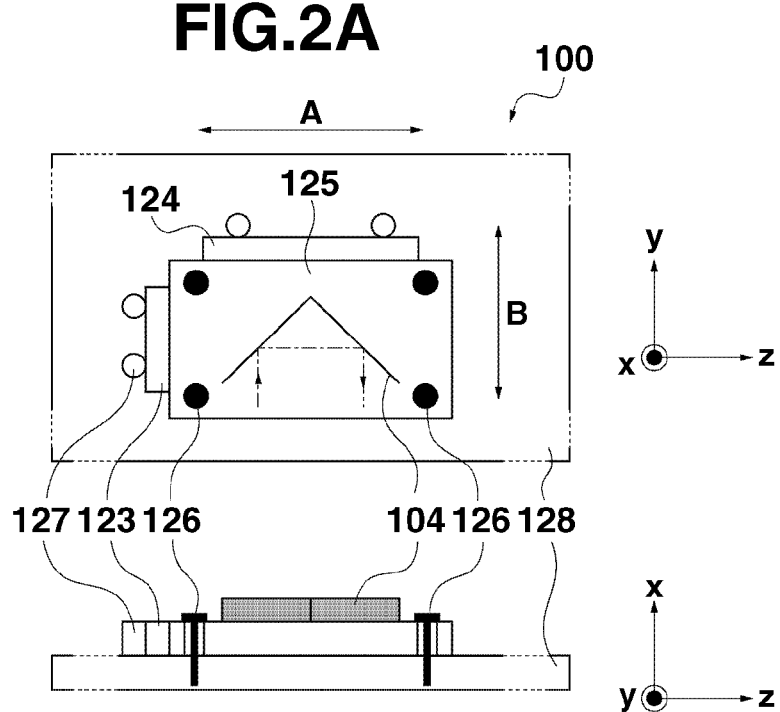
FIGS. 2A and 2B, respectively, is a schematic view of a position-variable mechanism.

FIG. 2A is an exemplary example of the configuration of the position-variable mechanism 100 using a spacer. An upper view is a top view and a lower view is a cross sectional view. In the position-variable mechanism 100, the reflection mirror 101 is fixed to a plate 125 by bonding or the like. The plate 125 is fixed to a base 128 by a fixing screw 126 after the plate 125 is position-adjusted on a YZ plane using spacers 123 and 124 of which facing parallelism are secured. When the position adjustment is performed by the spacers 123 and 124, a plurality of spacers having different thicknesses are prepared to be replaced sequentially, thereby being able to adjust a position of the plate 125 with respect to an A direction and a B direction in FIG. 2A. Positioning pins 127 serve as a guide and are arranged such that the positioning pins 127 support the spacers 123 and 124 in parallel with respect to the B direction and the A direction, respectively. More specifically, the positioning pins 127 of the spacer 124 are arranged so as to be in parallel with the A direction and the positioning pins 127 of the spacer 123 are arranged so as to be in parallel with the B direction. Accordingly, a position of the plate 125 can be adjusted to be in parallel with the A direction and the B direction, respectively, using the spacers 123 and 124 and the positioning pins 127. In view of the above, in the position-variable mechanism 100, the position of the reflection mirror 101 fixed onto the plate 125 can be independently adjusted in each of the A direction and the B direction (i.e., in each of a z direction and a y direction) by changing thicknesses of the spacers 123 and 124.

Figure 2B:
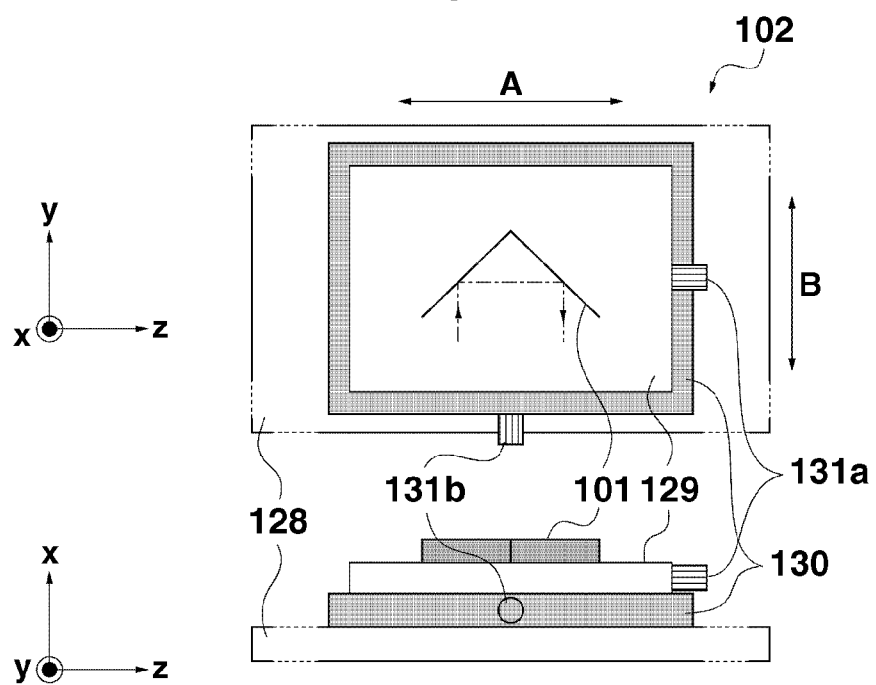

FIG. 2B illustrates a configuration of a position-variable mechanism 102 including a stage 129 of which position can be adjusted in a direction vertical to the optical axis (i.e., in the A direction) and a stage 130 of which position can be adjusted in a direction in parallel with the optical axis (i.e., in the B direction). An upper view is a top view and a lower view is a view viewed from the y direction. The reflection mirror 101 is fixed to the stage 129 that is arranged on the base 128 and can be moved in the A direction. The stage 129 is arranged on the stage 130 that can be moved in the B direction such that the stage 129 is movable on the stage 130.

The stages 129 and 130 are provided with clamps 131a and 131b, respectively, serving as a guide. The clamps 131a and 131b are used to fix the stage 129 at an arbitrary position in the A direction and the stage 130 at an arbitrary position in the B direction, respectively. In other words, after the positions of the stages 129 and 130 are adjusted with respect to the A direction and the B direction, positions of the stages 129 and 130 are fixed using the clamps 131a and 131b, thereby enabling an adjustment of the position of the reflection mirror 101 in each of the A direction and the B direction independently from each other.

The position-variable mechanism 102 may include a driving source (not shown) such as a piezo element and a motor in each of the A direction and the B direction, and independently adjust the positioning in the respective direction. In this case, the stages 129 and 130 are to be fixed using clamps serving as a guide, after the adjustment, such that the stages 129 and 130 do not move. A command from a control apparatus of the respective stage to the driving source moves the stage to a desired position and thereafter causes the stage to be stopped at the desired position.

The position-variable mechanism 100 or 102 is adjusted in a direction vertical to the optical axis of the incident light (i.e., in the A direction or a first direction), only the relative position between the subject light and the reference light on the light receiving surface of the image sensor 8 can be changed without changing the optical path length difference between the reference light and the subject light. When the position-variable mechanism 100 or 102 is adjusted in a direction in parallel with the optical axis of the incident light (i.e., in the B direction or a second direction), only the optical path length difference can be changed without changing the relative position between the reference light and the subject light. Specifically, adjustment of the position of the reflection mirror 101 independently in each of the A direction and the B direction, as it is done for the position-variable mechanism 100 or 102, enables an independent adjustment of the relative position between the reference light and the subject light and the optical path length difference therebetween.

Two axis directions of the position-variable mechanism are not limited to the direction vertical to the optical axis of the incident light and the direction in parallel with the optical axis of the incident light. Examples of the cases are described below in which+, for example, the position-variable mechanism is adjusted in the first direction shifted by an angle θ (i.e., 0 degree<θ<180 degrees) with respect to the optical axis of the incident light on the YZ plane and in the second direction shifted by an angle θ' (0 degree<θ'<180 degrees) different from that in the first direction. Here, it is provided that both of the θ and the θ' are not 90 degrees.

In both of the cases where the position-variable mechanism is adjusted in the first direction and the second direction, both of the relative position between the reference light and the subject light and the optical path length difference therebetween are changed at the same time. Change amounts of the relative position and the optical path length difference change according to a direction in which the position-variable mechanism moves. Specifically, in a case where the position-variable mechanism moves in the first direction and in a case where the position-variable mechanism moves in the second direction, the change amount of the relative position differs from the change amount of the optical path length difference.

Therefore, in a case where only the relative position between the reference light and the subject light is adjusted, the movement of the position-variable mechanism in the first direction and the movement position-variable mechanism in the second direction are concomitantly used such that the change of the optical length difference between the reference light and the subject light is eliminated, i.e., such that the reflection mirror 101 moves in the A direction. Alternatively, in a case where only the optical path length difference is adjusted, the position-variable mechanism is moved in the first direction and in the second direction so as to eliminate the change of the relative position, i.e., so as to cause the reflection mirror 101 to move in the B direction. Therefore, the adjustment of the position-variable mechanism in each of the first direction and the second direction enables the independent adjustment of the relative position and the optical path length difference. The change amounts of the relative position and the optical path length difference in the first direction and the second direction may be preliminarily calculated to use the change amounts for the adjustment of the position-variable mechanism.

Now, an adjustment method of a surface position measuring apparatus 200 is described with reference to a sequence illustrated in FIG. 3. In the adjustment of the surface position measuring apparatus 200, before the adjustment is performed using a low coherent white light source, a rough adjustment of the surface position measuring apparatus 200 is preferably performed using a laser light source having a high coherence and directivity.

In step S10, for example, a helium-neon laser (He—Ne laser) is arranged as the light source 1 and the optical elements are arranged on the base 128. At the time, a plane plate for adjustment is arranged at a position of a designed working distance instead of the substrate 3. Use of the laser having coherence higher than that of the white light source as the light source enables an easy interference between the reference light and the subject light. Accordingly, the rough adjustment of each of the optical elements of the surface position measuring apparatus 200 can be performed.

In step S11, using the laser light source, decentering adjustment of each of the optical elements is performed. Use of the laser light source having high directivity enables an accurate adjustment of decentering of the beam splitters and the mirrors and angles of the reference mirrors and the detection object. An adjustment error that occurs when the surface position measuring apparatus 200 is configured can be reduced. In this step, the interference fringes according to the laser light can be observed by the image sensor 8 and the number of interference fringes can be decentering-adjusted so as to be equal to or less than one (i.e., to be one color).

In step S20, the white light source is arranged instead of the laser light source for the sake of a fine adjustment of the surface position measuring apparatus 200. In step S21, using the position-variable mechanism, the reflection mirror 101 is moved in the A direction to finely adjust the relative position between the reference light and the subject light. As one of the specific adjustments, it is preferable that an image of the reference light is brought into a state superimposed onto an image of the subject light on the image sensor 8 of the transmission slit plate 30 using light through a transmission slit plate 30.

In step S22, the optical path length difference between the reference light and the subject light is finely adjusted. In a case where the reflection mirror 101 is moved in the B direction using the position-variable mechanism, only the optical path length difference between the reference light and the subject light changes without the relative position between the reference light and the subject light being changed, so that the optical path length difference can be adjusted. In the specific adjustment method of the optical path length difference, provided that when the interference signal contrast obtained by the image sensor 8 becomes the maximum, the optical path length difference is regarded as zero, the position of the reflection mirror 101 is adjusted based on the maximum value of the interference signal contrast. How to obtain the maximum value of the interference signal contrast is described below in detail.

After the surface position measuring apparatus 200 is adjusted such that coherent light between the reference light and the subject light can be obtained, in step S23, whether the interference fringes of the measurement region obtained by the image sensor 8 is the one-color is determined. In a case where the interference fringes are not one-color, in step S24, the position of each of the optical elements (including the reflection mirror 101) of the surface position measuring apparatus 200 is adjusted and steps S21 through S24 are repeated until the interference fringes becomes one-color. Adjustment of the position of each of the optical elements based on the obtained white light interference signal enables correction of the relative position between the subject light and the reference light and the optical path length difference therebetween. After confirming that the interference fringes are one-color, the adjustment of the surface position measuring apparatus 200 is ended.

As described above, the rough adjustment is performed using the laser light source having the higher coherence and directivity and then the fine adjustment is performed using the white light source having low coherence, thereby enabling the adjustment of the surface position measuring apparatus 200 in a short time period in comparison with a case where the adjustment is performed only using the white light source.

In addition to a case where the adjustment of the surface position measuring apparatus 200 is performed using two light sources such as the laser light source and the white light source, the surface position measuring apparatus 200 may be adjusted such that a wavelength bandwidth of the white light source is changed using a bandpass filter to adjust the coherence, thereby performing the rough adjustment and the fine adjustment.

Subsequently, a measuring method of the surface position, after completing the adjustment, using the surface position measuring apparatus 200 is described below. Initially, a measuring method of the coherent light between the subject light and the reference light is described below.

In FIG. 1, the substrate 3 is held by the substrate chuck CK to be arranged on the Z stage 5, the Y stage 6, and the X stage 7. In order to obtain the coherent light between the subject light and the reference light by the image sensor 8 in the form of an electronic signal, the Z stage 5 is driven and the light intensity of each of the pixels of the image sensor 8 corresponding to a reflection point on the substrates 3 is stored in a storage device (not shown). In a case where the measurement region of the substrate 3 is changed, a desired region is positioned so as to be positioned at the light receiving region using the X stage or the Y stage and thereafter the above described measurement is performed. Although it is not illustrated in FIG. 1, in order to accurately control positions of the X stage, Y stage, and Z stage, the laser interferometers are provided for each of the five axes such as the X axis, the Y axis, the Z axis, tilt axes ωx and ωy. Then, a closed loop control is performed based on an output of the laser interferometer, so that more accurate surface position measurement can be performed. The substrate 3 is split into a plurality of regions to perform the measurement. In a case where a global shape of the entire substrate 3 is required, better stitching of shape data can be achieved using the laser interferometer, so that this is the preferable structure.

Figure 4:
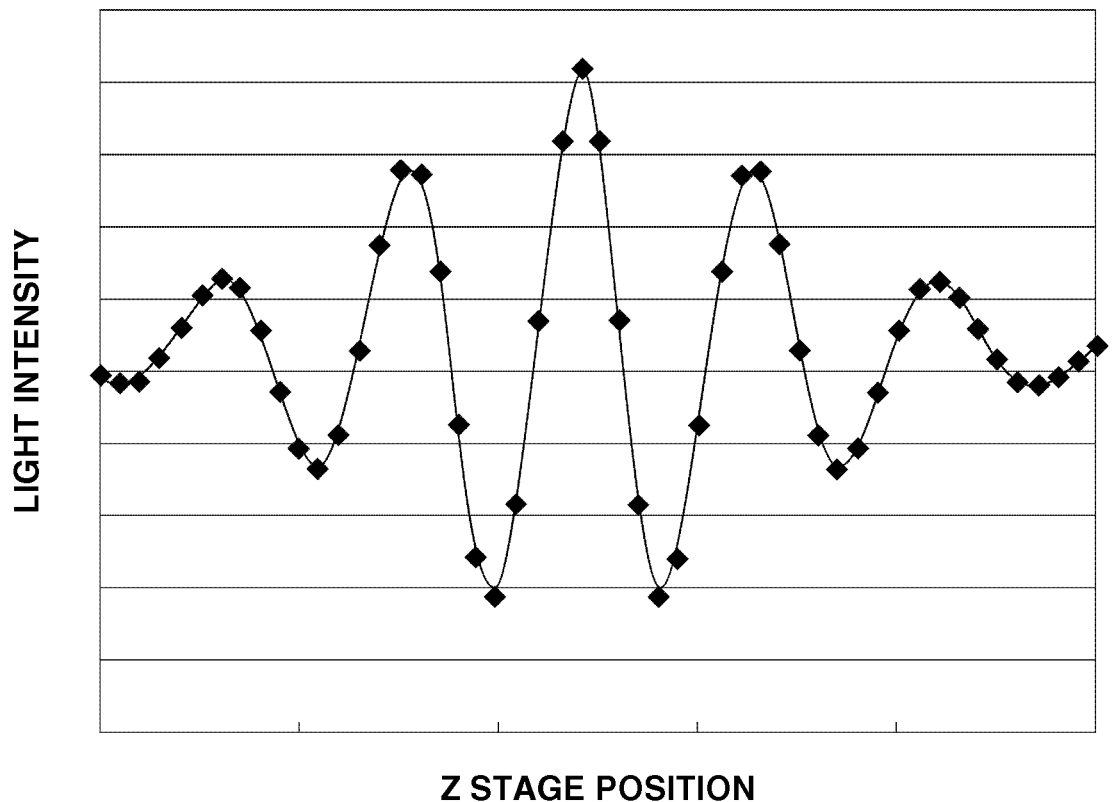
FIG. 4 illustrates a measurement signal of coherent light in a certain pixel.

A signal processing method of thus measured data of the coherent light, that is obtained by the image sensor 8 and stored in the storage device, is described below. The data (i.e., a signal) measured at a certain pixel of the image sensor 8 is illustrated in FIG. 4. This signal is also referred to as an interferogram. A horizontal axis is a measured value (i.e., a Z stage position) measured by a Z axis length measurement interferometer (a capacitance sensor may be used as the length measurement sensor). A vertical axis is an output value (i.e., a light intensity) of the pixel of the image sensor 8. An arithmetic processing unit 400 extracts the maximum value (i.e., a peak value) from the measurement signal of FIG. 4. The position of the Z stage corresponding to the maximum value corresponds to the position of the surface of the substrate to be measured at the pixel.

Therefore, a three-dimensional shape measurement of the substrate 3 can be realized according to a position measurement of the surface of the substrate at all the pixels of the image sensor 8. In extracting the peak position of the measurement signal, the peak position can be calculated by a resolution of equal to or less than 1/10 of a sampling pitch Zp of the Z axis as the horizontal axis of FIG. 4 according to a curve approximation (e.g., a quadric) based on a position of the signal peak and data of several points before or after the position of the signal peak. The sampling pitch Zp may be driven step by step actually at pitches equal to the sampling pitch Zp, or the Z stage 5 may be driven at a uniform velocity to take the interference signal into at a time sampling to obtain the sampling pitch Zp. As a method for measuring a position of the peak, a publicly known art of Frequency Domain Analysis (FDA) can be used. According to the FDA method, a phase gradient of the Fourier spectrum is used to obtain the peak position of the contrast.

In the white light interferometry, a resolution thereof depends on how accurately the optical path length difference between the reference light and the subject light is set to zero. Therefore, in addition to the FDA method, some fringe analysis methods such as a method that an envelope of white interference fringes is obtained according to a phase shift method or a Fourier transform method and thereby a zero point of the light path difference is obtained based on the maximum position of the fringe contrast and a cross-phase method, are proposed as a publicly known art.

As described above, according to the present exemplary embodiment, the reflection mirror 101 is moved in a direction vertical to the optical axis of the incident light (i.e., in the A direction) and in a direction in parallel with the optical axis of the incident light (i.e., in the B direction), respectively, thereby being able to independently adjust the relative position between the reference light and the subject light and the optical path length difference therebetween. Accordingly, a measurement signal having a high contrast can be obtained and thereby the measurement accuracy of the position of the surface of the detection object can be enhanced.

Figure 5:
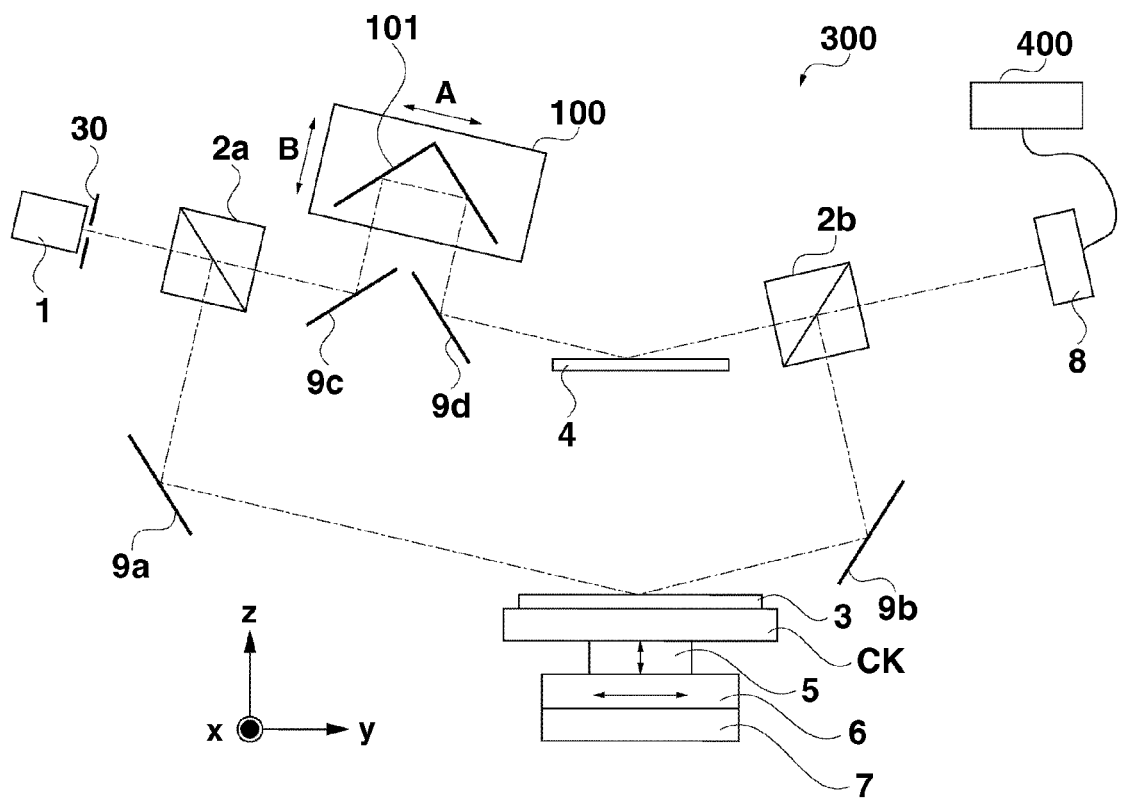
FIG. 5 is a schematic view of a surface position measuring apparatus according to a second exemplary embodiment.

Now, a second exemplary embodiment of the present invention is described below. FIG. 5 is a top view schematically illustrating a configuration of a surface position measuring apparatus 300 according to the second exemplary embodiment. Members identical to the members illustrated in FIG. 1 are provided with the same reference numbers/symbols and redundant descriptions thereof are omitted here.

The surface position measuring apparatus 300 is an oblique-incidence white interferometer for detecting a position of the substrate 3 in a height direction (i.e., in the Z direction). The surface position measuring apparatus 300 includes optical elements arranged differently from those of the apparatus illustrated in FIG. 1, a reference mirror 4, and four mirrors 9a, 9b, 9c, and 9d. An optical flat glass, a SiC mirror, an aluminum mirror, or the like are used as the reference mirror 4.

Among the subject light and the reference light split by the beam splitter 2a, the subject light is irradiated obliquely onto the substrate 3 and enters into the beam splitter 2b after being reflected by the substrate 3. On the other hand, the reference light is irradiated obliquely onto the reference mirror 4 through a reflection mirror 101 and enters into the beam splitter 2b after being reflected by the reference mirror 4. The subject light and the reference light are combined in the beam splitter 2b and the combined light is received by the image sensor 8. In the beam splitter 2b, the subject light is superimposed onto the reference light, thereby causing the interference of light. Therefore, the image sensor 8 receives the coherent light by the light receiving surface of the image sensor 8 and outputs a signal corresponding to the coherent light.

In the present exemplary embodiment, a desirable angle of incidence into the substrate 3 is a value equal to or more than 60 degrees. This is because a reflected light intensity becomes higher with an increase in the angle of incidence. For example, in a case where a thin film (e.g., a resist) having a thickness of a several hundred nm is formed on the substrate 3, the reflected light from the substrate 3 includes a reflected light from a rear surface of the resist in addition to a reflected light from a front surface of the resist.

In order to measure the reflected light from the front surface of the resist independently from the reflected light from the rear surface of the resist, the angle of incidence into the substrate 3 is set larger to make a reflectance from the front surface of the resist higher. Accordingly, the reflected light from the front surface of the resist of the substrate 3 can be relatively stronger than the reflected light of the rear surface of the resist. Especially, in a case where light enters with an incident angle equal to or more than the Brewster angle (also, referred to as an angle of polarization) with respect to the thin film formed on the substrate 3, a special effect can be produced.

A description is made below as to this special effect. A phase shifting occurs in a p-polarized light by n at a border of the Brewster angle. For example, it is provided that a refractive index of the resist is 1.5, the Brewster angle of an air/resist interface is 56.3 degrees. Further, if the substrate is formed of Si and the refractive index is set to 3.8, the Brewster angle of the resist/substrate interface is 68.5 degrees. If it is provided that the angle of incidence is set to, for example, 60 degrees, according to the Snell's law, the angle of incidence from the resist to the substrate 3 is 35 degrees, which is smaller than the Brewster angle of the resist/substrate interface. Still further, even if the angle of incidence is set to 89 degrees and the light enters at an angle of incidence as closer as that of the substrate 3, the angle of incidence from the resist to the substrate is 41 degrees, which also is smaller than the Brewster angle of the resist/substrate interface.

Therefore, in a case where the p-polarized light enters at an angle equal to or more than the Brewster angle of the air/resist interface, a phase shifting occurs by π between the reflected light of the front surface of the resist and the reflected light of the resist/substrate interface. On the other hand, no phase change occurs in an s-polarized light before and after the Brewster angle. As a result thereof, no phase shifting occurs between a phase of the coherent light between the reflected light and the reference light of the air/resist interface as to the p-polarized component and a phase of the coherent light between the reflected light and the reference light of the air/resist interface as to the s-polarized component. However, a phase is shifted by n between the phase of the coherent light between the reflected light and the reference light of the resist/substrate interface as to the p-polarized component and the phase of the coherent light between the reflected light and the reference light of the resist/substrate interface as to the s-polarized component. In a case where unpolarized light is used, a measurement signal thereof comes to have a light intensity of a combination of a light intensity of the coherent light of the p-polarized light and a light intensity of the coherent light of the s-polarized light. Therefore, the coherent light between the reflected light and the reference light of the resist/substrate interface is eliminated and the measurement signal comes to have a low contrast. Therefore, since the measurement signal of the coherent light between the reflected light and the reference light of the resist/substrate interface becomes smaller with respect to the measurement signal of the coherent light between the reflected light and the reference light of the air/resist interface, a position measurement accuracy of the front surface of the resist improves.

If the p-polarized light is irradiated at the Brewster angle onto the resist, the p-polarized reflected light of the front surface of the resist does not exist, so that the angle of incidence of a value at least equal to or more than 60 degrees, that is larger than the angle of incidence of the Brewster angle, is preferred. Detailed description of the above is discussed in Japanese Patent Laid-open Publication No. 2009-204512.

In the oblique-incidence white interferometer according to the present exemplary embodiment, scanning of the substrate 3 and the reference mirror 4 in the Z direction changes the relative position and the optical path length difference between the reference light and the subject light at the same time. Therefore, if the substrate 3 and the reference mirror 4 are scanned in the Z direction, the relative position and the optical path length difference between the reference light and the subject light cannot be adjusted independently.

In a case where shifting occurs in the relative position between the reference light and the subject light at a position where the optical path length difference between the reference light and the subject light is zero, a signal contrast lowers according to lowering of the coherence, so that an accurate surface position measurement cannot be realized. In order to obtain a high measurement accuracy in the oblique-incidence white interferometer, it becomes material that the relative position and the optical path length difference between the reference light and the subject light are to be adjusted and the relative position is preliminary adjusted so as to match at the position where the optical path length difference is zero.

In the present exemplary embodiment, as it is similar to the first exemplary embodiment, the position-variable mechanism 100 or 102 is used to independently adjust the relative position between the reference light and the subject light and the optical path length difference therebetween in the optical axis direction. A location of the position-variable mechanism in the surface position measuring apparatus 300 is not limited to within the reference light path as illustrated in FIG. 5, but may be within the light path of the subject light or within both of the light path of the reference light and the light path of the subject light.

According to the present exemplary embodiment, the relative position between the reference light and the subject light and the optical path length difference therebetween in the optical axis direction are independently adjusted, so that a position of the front surface of the substrate 3 can be measured accurately. Further, an effect by the reflected light of the resist/substrate interface can be reduced in the measurement data and thus the measurement accuracy can be improved.

Figure 6:
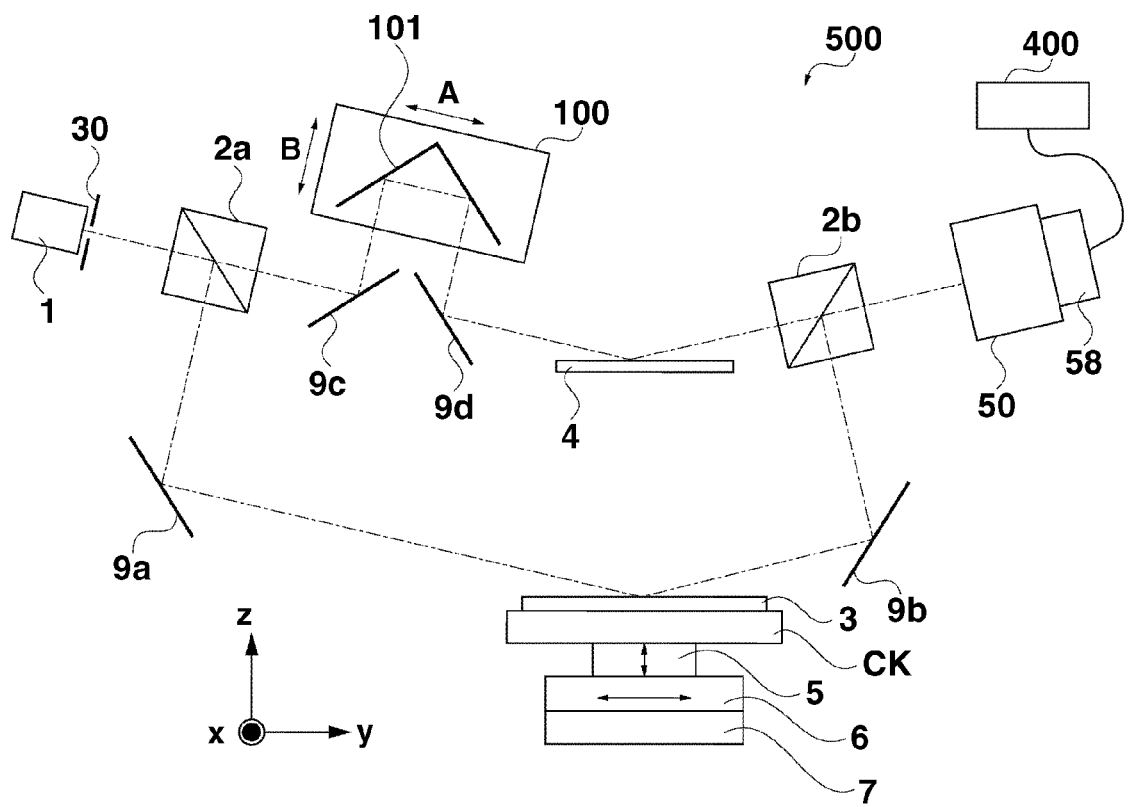
FIG. 6 is a schematic view of a surface position measuring apparatus according to a third exemplary embodiment.

Now, a third exemplary embodiment of the present invention is described below. FIG. 6 is a top view schematically illustrating a configuration of a surface position measuring apparatus 500 according to the third exemplary embodiment. Members identical to those illustrated in FIGS. 1 and 2 are provided with the same reference numbers or symbols and thus redundant descriptions thereof are omitted here. The surface position measuring apparatus 500 is the oblique-incidence white interferometer for detecting the position of the substrate 3 in the height direction (i.e., in the Z direction) and uses a spectroscope 50 and a two-dimensional image sensor 58 instead of the image sensor 8 of the apparatus illustrated in FIGS. 2A and 2B.

In an opening of the transmission slit plate 30, a direction vertical to a plane of incidence (i.e., the X direction) is a lengthwise direction and a direction vertical to the above direction is a widthwise direction. The subject light and the reference light are combined at the beam splitter 2b and are received by the two-dimensional image sensor 58 through the spectroscope 50. Therefore, the image sensor 58 receives the coherent light at the light receiving surface and outputs a signal corresponding to the coherent light.

Figure 7:
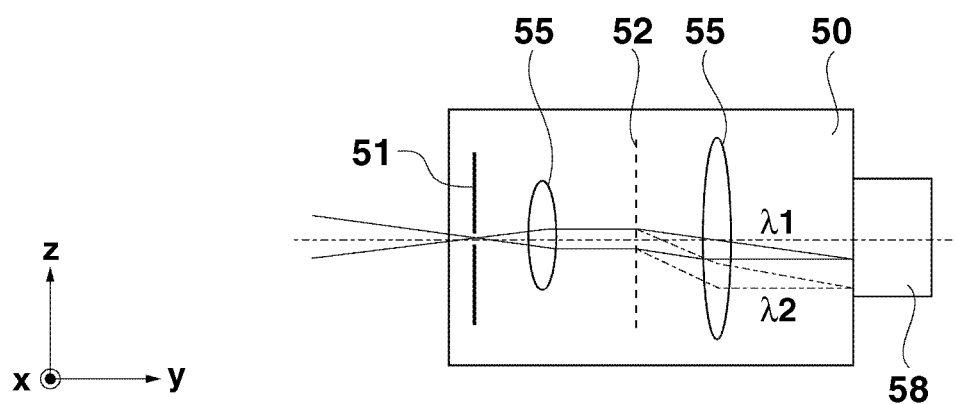
FIG. 7 is a schematic view of a spectroscope.

The spectroscope 50 includes an incident slit 51, a diffraction grating 52, and an imaging optical system 55 (i.e., a mirror optical system) as it is illustrated in FIG. 7. The light having passed through the incident slit 51 enters into the diffraction grating 52. The diffraction grating 52 causes the coherent light to diffract once for every wavelength with respect to the widthwise length of the incident slit 51 and converts the diffracted coherent light into a signal expanding in a space resolved direction and expanding in a wavelength resolved direction (i.e., the X direction).

In the two-dimensional image sensor 58, the coherent light coming through the spectroscope 50 is received as one-dimensional position information and as wavelength information. As the spectroscope, a Czerney-Turner type spectroscope having a typical configuration can be used. The two-dimensional image sensor 58 (e.g., a two-dimensional CCD) transfers and reads a charge generated by a photoelectromotive force of a photodiode to acquire image information. Examples of the two-dimensional image sensor 58 include an inline transfer type image sensor and a frame transfer type image sensor according to a charge transfer method. Among the above examples, in the present exemplary embodiment in which a spectrometry is performed, the frame transfer type readout circuit having a high SN ratio of the signal is employed. In the frame transfer type image sensor, thus received light is stored as the charge in each of the pixels and thereafter, all the pixels are transferred and read to end reading of one frame. Therefore, in a case where the surface position of the substrate 3 is detected by the spectroscope, it is desirable that the transmissive slit board 30 is arranged such that, for example, the lengthwise direction becomes the X direction and the wafer stage WS is caused to be scanned in the Y direction. By using the image sensor, the measurement signal of the coherent light within a range where the wafer stage WS moves is acquired before image capturing of one frame is ended (i.e., while a period of image capturing of one frame), thereby being able to detect the position of the substrate 3 in the height direction (i.e., in the Z direction). In a case where the measurement is performed throughout the entire area of the substrate 3, it is preferable to repeat an operation that the wafer stage WS is caused to be scanned in a constant direction (i.e., in the Y direction) and the wafer stage WS is stepped by $\Delta X$ in a direction vertical to the scanning direction (i.e., the x direction).

Figure 8A:
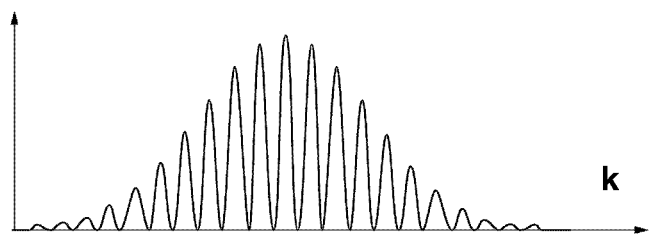
FIGS. 8A through 8C, respectively, illustrates a signal from the spectroscope and signal processing.
Figure 8B:
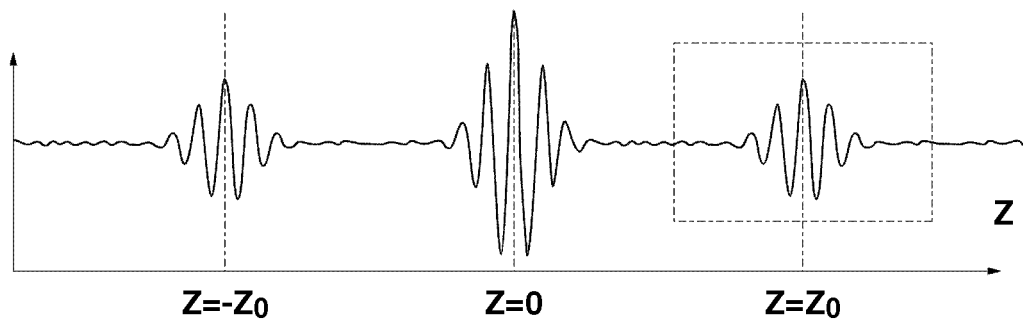

A method that the measurement signal of the coherent light received by the two-dimensional image sensor 58 and stored in the storage device is processed to obtain a shape (i.e., surface position) of the substrate 3 is described below. An example of the signal received by the two-dimensional image sensor 58 is illustrated in FIG. 8A. A horizontal axis represents a wave number and a vertical axis represents a light intensity. The coherent light is diffracted per wavelength using the spectroscope 50 and thereby the diffracted coherent light is detected by the two-dimensional image sensor 58 in the form of a spectral signal in which the optical path length difference between the reference light and the subject light are converted into difference of frequency. The Fourier transformation is performed by the arithmetic unit with respect to this spectral signal to convert the spectral signal from a frequency region to a space region. Then, a real number portion thereof is extracted to acquire the white light interference signal having the optical path length difference in a real space (see FIG. 8B). In FIG. 8B, a horizontal axis represents a measurement value corresponding to the height direction (i.e., the Z axis direction) of the substrate 3 and a vertical axis represents an output of the light intensity at the two-dimensional image sensor 58.

In a case where there is the optical path length difference $Z_0$ within a coherence length area between the reference light and the subject light, interference appears at positions of $Z=0$ and $Z=\pm Z_0$ with respect to the Z direction of the horizontal axis. A distance of this maximum peak position corresponds to the optical path length difference between the reference light and the subject light, so that information as to height of the front surface of the substrate 3 can be acquired by detecting the peak position.

Figure 8C:
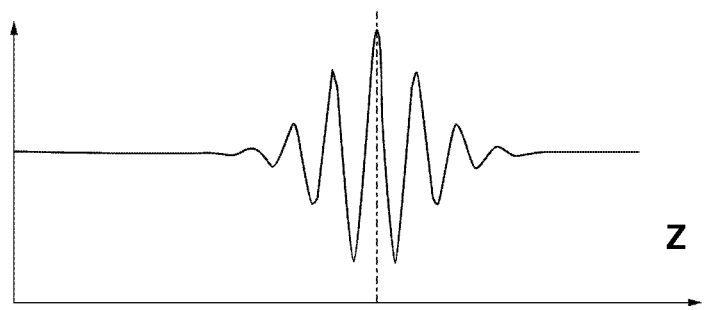

FIG. 8C illustrates that the interference signal at a position of $Z=Z_0$ is extracted. A position of the signal peak of this interference signal is calculated and the measured value in the corresponding Z direction comes to be a height measurement value of the pixel. A height measurement of all the pixels of the two-dimensional image sensor 58 enables a three-dimensional shape measurement of the substrate 3. A peak position detection method of the interference signal is identical to that of the first exemplary embodiment.

In a spectral type oblique-incidence white interferometer, the optical path length difference Z0 is added to a position between the reference light and the subject light and the detection object is caused to be scanned in the Y direction to perform the measurement. If the substrate 3 and the reference mirror 4 are scanned in the Z direction when the optical path length difference Z0 is added, both of the relative position and the optical path length difference between the reference light and the subject light change. Therefore, independent adjustment of the relative position and the optical path length difference between the reference light and the subject light cannot be made by scanning the substrate 3 and the reference mirror 4 in the Z direction. In a case that shifting occurs in the relative position between the reference light and the subject light in the position of the optical path length difference Z0, since white light has a low coherence, the signal contrast lowers according to lowering of the coherence and therefore the surface position cannot be measured accurately. Consequently, in order to obtain high measurement accuracy in the oblique-incidence white interferometer, it is material to adjust the relative position such that the relative position matches at a desired position of the optical path length difference Z0. In the Z scanning type white interferometer illustrated in the first and the second exemplary embodiments, adjustment is performed such that the relative position in a direction of cross section of the optical axis matches when the optical path length difference between the reference light and the subject light is zero. To the contrary, in the present exemplary embodiment, a position in the direction of the cross section is matched at a center of the measurement range (Z0). The center Z0 of the measurement range is required to be added with the optical path length difference equal to or more than two times as the coherent length such that a center position is not superimposed on a dead signal with respect to Z of Z=0.

Now, an adjustment method of the surface position measuring apparatus 200 using the position-variable mechanism 100 is described below. An example of one of methods for adding the optical path length difference Z0 includes a method that a position of the position-variable mechanism 100 is adjusted in a direction in parallel with the incident optical axis (i.e., in the B direction) from a position where the optical path length difference is zero, thereby giving the optical path length difference. Initially, the spectroscope 50 is removed and adjustment is performed in a manner identical to the adjustment method of the oblique-incidence white interferometer according to the second exemplary embodiment. Accordingly, the relative position is caused to be matched at the position where the optical path length difference between the reference light and the subject light is zero. Then, a position of the position-variable mechanism 100 is adjusted in a direction in parallel with the incident optical axis (i.e., in the B direction) such that the optical path length difference between the reference light and the subject light becomes Z0. In a case where the position of the position-variable mechanism 100 is adjusted in the B direction, since the relative position between the reference light and the subject light does not change, the position-variable mechanism 100 can be adjusted such that the relative position matches at the position of the optical path length difference Z0. When the position-variable mechanism 100 is adjusted to the position of the optical path length difference Z0, the position of the position variable mechanism 100 may be adjusted in the direction in parallel with the incident optical axis (i.e., in the B direction) based on the interference signal acquired by the two-dimensional image sensor 58 through the spectroscope 50.

As described above, the relative position between the reference light and the subject light can be matched at the position of the optical path length difference Z0 by adjusting the position of the position-variable mechanism 100 in the direction vertical to the incident optical axis (i.e., in the A direction) and in the direction in parallel with the incident optical axis (i.e., in the B direction), respectively. Accordingly, a highly accurate measurement can be realized.

In a case where shapes are measured in a plurality of measurement regions on the substrate 3, similar to what is described in the above first exemplary embodiment, the X stage and the Y stage are driven to be positioned at a predetermined region and thereafter the interference signal is obtained and processed.

A description of an exemplary embodiment in a case of using a lens is omitted for the sake of simplification of the description in the above described three exemplary embodiments. However, an optical system including a lens can be used. As illustrated in FIG. 9, the lens is arranged such that the transmission slit plate 30, the reference mirror 4 or the substrate 3, and the incident slit 51 of the spectroscope 50 are optically conjugate. In other words, by the imaging optical system 22 including the lenses 12a and 12b, the light from the opening of the transmission slit plate 30 is split in the beam splitter 2a and thereafter forms an image on the surfaces of the substrate 3 and the reference mirror 4, respectively. Then, the light reflected by the substrate 3 and the reference mirror 4 is superimposed on each other in the beam splitter 2b and thereafter the light coming through the transmission slit plate 30 via the substrate 3 forms an image on the incident slit 51 of the spectroscope 50 by the imaging optical system 23 including the lenses 12c and 12d. The light guided to the spectroscope 50 is diffracted once per a wavelength by the diffraction grating 52 with respect to the widthwise direction of the incident slit 51 and received by the two-dimensional image sensor 58. The above described signal processing is provided to the signal acquired by the two-dimensional image sensor 58, thereby being able to measure the surface position of the substrate 3.

As described above, according to the present exemplary embodiment, an independent adjustment of the relative position between the reference light and the subject light and the optical path length difference therebetween enables an acquirement of a high contrast measurement signal. Accordingly, the measurement accuracy of the surface position of the detection object can be improved.

Figure 10:
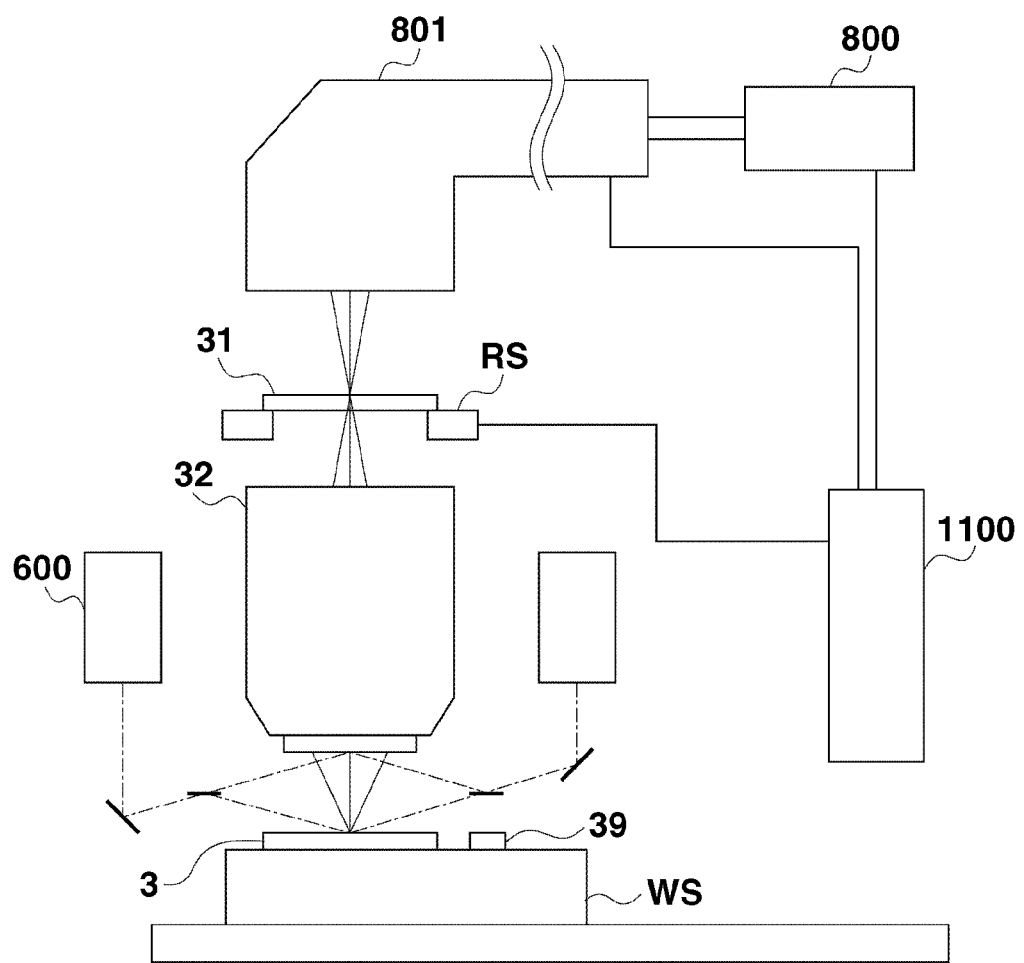
FIG. 10 is a schematic view of an exposure device.

Now, a fourth exemplary embodiment of the present invention is described below. FIG. 10 illustrates a schematic view of an exposure device including the above described surface position measuring apparatus. As it is illustrated in FIG. 10, the exposure device includes a light source 800, an illumination optical system 801, a reticle stage RS for placing a reticle 31 thereon, a projection optical system 32, a wafer stage WS (i.e., a substrate stage) for placing a wafer 3 thereon, a surface position measuring apparatus 600, and a control unit 1100. The above described surface position measuring apparatus can be applied to the surface position measuring apparatus 600.

The control unit 1100 includes a central processing unit (CPU) and a memory and is electrically connected to the light source 800, the illumination optical system 801, the reticle stage RS, the wafer stage WS, and the surface position measuring apparatus 200 to control the operation of the exposure device. The control unit 1100 can operate and control a surface position measurement value of the wafer 3 in the surface position measuring apparatus 600. The control unit 1100 further can correct-operate and control the measurement value upon detecting the surface position.

The light source 800 uses, for example, a laser. The laser may be an ArF excimer laser having a wavelength of about 193 nm, a KrF excimer laser having a wavelength of about 248 nm, or the like. However, a type of the light source is not limited to the excimer laser.

The illumination optical system 801 is an optical system for illuminating a surface to be illuminated using light flux coming from the light source 800. The illumination optical system 801 forms the light flux into an exposure slit having a predetermined optimum shape for exposure and illuminates the reticle 31 on which a circuit pattern to be transferred is formed. The illumination optical system 801 includes a lens, a mirror, an optical integrator, an iris, or the like. For example, components are arranged in the order of, for example, a condenser lens, a fly-eye lens, an aperture stop, a condenser lens, a slit, and an imaging optical system.

The reticle (i.e., a mask) 31 as an original is made of, for example, crystal and formed with a circuit pattern to be transferred. The reticle 31 is supported and driven by the reticle stage RS. The diffracted light from the reticle 31 passes through the projection optical system 32 to be projected onto the wafer 3. The reticle 31 and the wafer 3 are arranged so as to have a conjugated relation. The reticle 31 and the wafer 3 are scanned at a velocity ratio of a scale down magnification ratio, thereby transferring the pattern of the reticle 31 onto the wafer 3. The exposure device includes a light oblique-incidence system reticle detection unit (not shown). A position of the reticle 31 is detected by the reticle detection unit and the reticle 31 is arranged at a predetermined position.

The reticle stage RS supports the reticle 31 through a reticle chuck (not shown) and is connected to a moving mechanism (not shown). The moving mechanism includes a linear motor or the like and thereby the reticle stage RS is driven in a direction of each of the X axis direction, the Y axis direction, and the Z axis direction including a rotation direction of each axis to move the reticle 31.

The projection optical system 32 has a function to form an image of the light flux from an object surface onto an image forming surface. The projection optical system 32 forms an image of the diffracted light through a pattern formed on the reticle 31 onto the wafer 3. The projection optical system 32 may be an optical system including a plurality of lens elements, an optical system including a plurality of lens elements and at least one piece of concave mirror (i.e., a catadioptric optical system), or an optical system including a plurality of lens elements and at least one diffractive optical element such as a piece of kinoform.

A photoresist is coated on the wafer 3 as the substrate. The wafer 3 is also a detection object of which surface position is to be detected by the surface position measuring apparatus 600. The wafer stage WS supports the wafer 3 by the wafer chuck. The wafer stage WS causes the wafer 3 to move in the direction of each of the X axis direction, the Y axis direction, and the Z axis direction including a rotation direction of each axis using the linear motor in a manner identical to a case of the reticle stage RS. The position of the reticle stage RS and the position of the wafer stage WS are monitored by, for example, a laser interferometer 81 (not shown) of 6 axes and are driven at a constant velocity ratio. A reference plate 39 is arranged on the wafer stage WS.

Now, measurement of the surface position (i.e., a focus) of the wafer 3 is described below. While the wafer 3 on the wafer stage WS is scanned over its entirety in a scanning direction (i.e., in the Y direction), the wafer surface position is measured by the surface position measuring apparatus 600, then the wafer stage WS is stepped by ΔX in a direction vertical to the scanning direction (i.e., in the X direction). Then, the operation to measure the surface position of the wafer in the scanning direction is repeated to measure the shape of the entire surface of the wafer 3. For the sake of a high throughput, a plurality of surface position measuring apparatus 600 may be used to measure the surface positions at different points on the wafer 3 at the same time. Alternatively, a light flux is irradiated onto each of the plurality of points on the wafer to be measured and each light flux is guided to the respective sensor. Accordingly, a tilt of a surface to be exposed to light may be calculated based on height measurement information at different positions.

Now, an adjustment method of the reference light and the subject light by the surface position measuring apparatus 600 in a case where the exposure device is provided with the surface position measuring apparatus 600 is described below. Initially, the plane plate for adjustment is arranged at a predetermined position corresponding to the reference position of the surface position measuring apparatus 600 instead of the substrate 3 as the detection object. The plane plate for adjustment preferably has a configuration identical to that of the wafer 3. Alternatively, an Al flat mirror or a glass made flat mirror may be used. Then, the position of the position-variable mechanism is adjusted in a direction vertical to the incident optical axis (i.e., in the A direction) and a direction horizontal to the incident optical axis (i.e., in the B direction), thereby performing the adjustment of the surface position measuring apparatus 600. A method identical to the method of the first exemplary embodiment may be applicable with respect to the adjustment method of the surface position measuring apparatus 600.

Preferably, the transmission slit plate 30 is arranged as an evaluation pattern when the relative position between the reference light and the subject light is adjusted. After the plane plate for adjustment is arranged and the adjustment of the surface position measuring apparatus 600 is completed, the plane plate for adjustment is removed, the surface position measuring apparatus 600 is arranged at the reference position of the exposure device, and the wafer 3 as the detection object is arranged at the predetermined position. A predetermined light path adjustment using the plane plate for adjustment enables an accurate match of the relative position between the reference light and the subject light in the cross section of the optical axis at a position where the optical path length difference is zero when the surface position measuring apparatus 600 is provided in the exposure device and the wafer 3 is provided at the predetermined position. Therefore, a highly accurate surface position measurement of the detection object can be performed without adjusting the light path after the surface position measuring apparatus 600 is installed in the exposure device. In a case of the spectral type white interferometer described in the third exemplary embodiment, it is preferable that the relative position between the reference light and the subject light is matched accurately in the cross section of the optical axis at a predetermined position of the optical path length difference.

Figure 11:
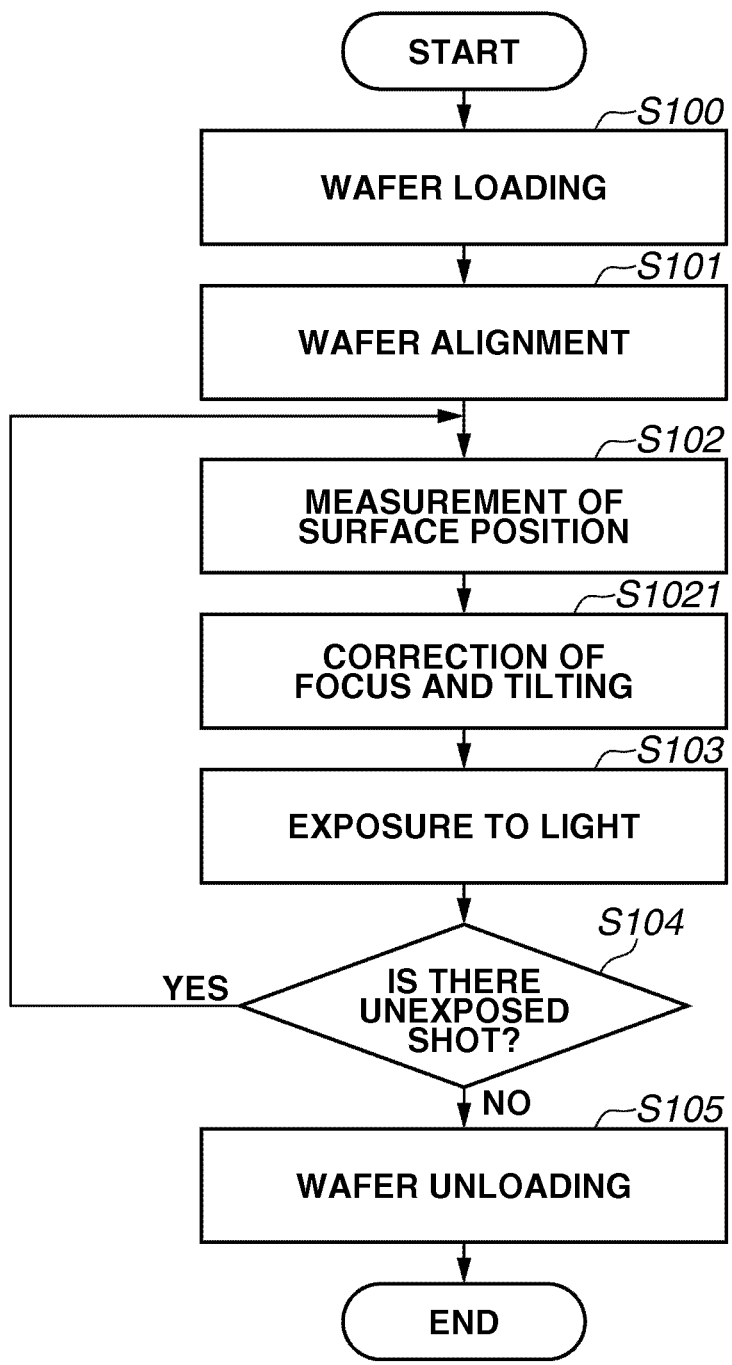
FIG. 11 is a flow chart of an exposure method.

Now, an exposure method using the present exposure device is described below in detail. FIG. 11 is a flow chart of the exposure method. In step S100, the wafer 3 is loaded into the exposure device. In step S101, a wafer alignment is performed with respect to this wafer 3. The wafer alignment is performed such that a position of a mark on the wafer is detected by an alignment scope (not shown) and positioning of the wafer 3 on the XY plane is performed with respect to the exposure device. In step S102, the surface position measuring apparatus measures the surface position of the predetermined portion on the wafer 3 and surface shape data of this wafer 3 is stored in the exposure device. In step S102, the wafer 3 is moved by the wafer stage WS such that a first exposure shot is positioned from a position below the surface position measuring apparatus to the exposure position below the projection lens 32. At the same time, the arithmetic processing unit of the exposure device creates surface position data of the first exposure shot based on the surface shape data of the wafer 3 as the measurement result of the above described surface position and calculates a shifting amount from an exposed image surface. Then, in step S1021 according to driving of the stage in the Z direction and the tilting direction based on the shifting amount shifted from this exposed image surface, the position of the stage is matched to the position in the height direction of the front surface of the wafer 3 per about an exposure slit unit.

In step S103, the exposure and the scanning of the wafer stage WS in the Y direction is carried out. Accordingly, when the first exposure shot is completed to be exposed to light, in step S105, presence or absence of the unexposed shot is determined in step S104. In a case where there is the unexposed shot, the processing returns to step S102. Then, in a similar manner to the case of the first exposed shot, surface position data of the next exposed shot is created by the arithmetic apparatus of the control unit 1100. The exposure is performed by driving the stage in the Z direction and the tilting direction during the operation for matching to the shape in the height direction of the front surface of the wafer 3 per an exposure slit unit. In step S104, determination is made whether or not there is the shot to be exposed (i.e., the unexposed shot) and the above described steps are repeated until there is no unexposed shot. After completing the exposure of all the exposed shots, in step S105, the wafer 3 is unloaded and the processing is ended.

The wafer stage WS may have a configuration of a twin stage in addition to a configuration of a single stage. Alternatively, the surface position measuring apparatus 200 may be arranged on the stage of a measurement station.

Since there are a complicated circuit pattern and a scribe line on the wafer 3, reflectance distribution or a local tilt tends to occur. Therefore, the accurate measurement of the surface position using the white interferometer that can reduce a measurement error caused by the reflectance distribution or the local tilt is a material technique. In order to realize highly accurate or high-speed surface position detection using the white interferometer, the present invention as to the adjustment of the light path between the reference light and the subject light produces a large effect. If the shape of the front surface of the wafer can be measured speedily and with a high accuracy, the accuracy improves as to the focusing of the optimum exposed surface and the front surface of the wafer. As a result thereof, a semiconductor element may have better performance and a manufacturing yield may be improved.

In the present exemplary embodiment, a case that the surface position measuring apparatus is applied as the wafer surface position measuring apparatus of the exposure device is described. However, the surface position measuring apparatus may be used as a focus calibration apparatus for calibrating focus in addition to the above described case.

According to the present exemplary embodiment, the relative position between the reference light and the subject light in the cross section of the optical axis and the optical path length difference therebetween in the optical axis direction can be accurately adjusted, thereby enabling to obtain a high coherence in the interferometer. Accordingly, the surface position of the substrate can be measured with a high accuracy. Accordingly, such an exposure device that high focus accuracy can be realized with respect to a small focus depth and an improved yield can be achieved can be provided.

Now, a fifth exemplary embodiment of the present invention is described below. A method of manufacturing a device (semiconductor device, liquid crystal display device, etc.) as an embodiment of the present invention is described.

The semiconductor device is manufactured through a front-end process in which an integrated circuit is formed on a substrate such as a wafer, and a back-end process in which a product such as an integrated circuit chip is completed from the integrated circuit on the wafer formed in the front-end process. The front-end process includes a step of exposing the substrate coated with a photoresist to light using the above-described exposure apparatus of the present invention, and a step of developing the exposed substrate. The back-end process includes an assembly step (dicing and bonding), and a packaging step (sealing).

The liquid crystal display device is manufactured through a process in which a transparent electrode is formed. The process of forming a plurality of transparent electrodes includes a step of coating a substrate such as a glass substrate with a transparent conductive film deposited thereon with a photoresist, a step of exposing the substrate coated with the photoresist thereon to light using the above-described exposure apparatus, and a step of developing the exposed glass substrate.

The device manufacturing method of this embodiment has an advantage, as compared with a conventional device manufacturing method, in at least one of performance, quality, productivity and production cost of a device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-007612, filed Jan. 16, 2010, which is hereby incorporated by reference herein in its entirety.

What is claimed is:

1. An apparatus comprising:
a system configured to split a light emitted from a light source into reference light and subject light, cause the subject light to enter into an object, and combine the subject light reflected by the object with the reference light;
a detection unit configured to detect coherent light between the combined subject and reference lights;
an element, provided within a light path of the reference light or the subject light, configured to change a path length difference between the reference light and the subject light and a relative position between the reference light and the subject light in a light receiving surface of the detection unit; and
a position-variable mechanism configured to cause a position of the element to be changeable;
wherein, by changing the position of the element using the position-variable mechanism, the path length difference and the relative position are independently adjusted,
wherein the element is movable in a first direction and a second direction vertical to the first direction, and
wherein, the relative position changes according to a change of the position of the element in the first direction and the optical path length difference changes according to the change of the position of the element in the second direction.

2. The apparatus according to claim 1, further comprising:
a plurality of the elements;
wherein the elements are arranged in a light path of each of the reference light and the subject light.

3. The apparatus according to claim 1, further comprising:
a spectroscope configured to disperse interfering light of the combination of the subject light and the reference light;
a sensing unit configured to capture the dispersed light; and
an imaging system configured to form an image of the object on an incident slit of the spectroscope.

4. The apparatus according to claim 3, further comprising:
a stage configured to cause the object to move; and
a control unit configured to control the stage;

wherein the object is moved while one frame is captured by the sensing unit.

5. A device comprising:
an apparatus comprising:
a system configured to split a light emitted from a light source into reference light and subject light, cause the subject light to enter into an object, and combine the subject light and the reference light reflected by the object;
a detection unit configured to detect coherent light between the combined subject and reference lights;
an element, provided within a light path of the reference light or the subject light, configured to change a path length difference between the reference light and the subject light and a relative position between the reference light and the subject light in a light receiving surface of the detection unit; and
a position-variable mechanism configured to cause a position of the element to be movable,
wherein the apparatus independently adjusts the optical path length difference and the relative position by changing the position of the element using the position-variable mechanism,
a projection system configured to project an image of a pattern of a mask onto a substrate,
a substrate stage configured to move the substrate,
wherein a position of a front surface of the substrate in an optical axis direction of the projection system is measured using the apparatus and the position is adjusted based on a measurement result using the substrate stage,
wherein the element in the apparatus is movable in a first direction and a second direction vertical to the first direction, and
wherein, the relative position changes according to a change of the position of the element in the first direction and the optical path length difference changes according to the change of the position of the element in the second direction.

6. The device according to claim 5, wherein the apparatus further comprises a plurality of the elements,
wherein the elements are arranged in a light path of each of the reference light and the subject light.

7. The device according to claim 5, wherein the apparatus further comprises:
a spectroscope configured to disperse interfering light of the combination of the subject light and the reference light;
a sensing unit configured to capture disperse light; and
an imaging system configured to form an image of the object on an incident slit of the spectroscope.

8. The device according to claim 7, wherein the apparatus further comprises:
a stage configured to cause the object to move; and
a control unit configured to control the stage,
wherein the object is moved while one frame is captured by the sensing unit.

9. A method comprising:
splitting a light from a light source into reference light and subject light, cause the subject light to enter into an object, and combine the subject light reflected by the object and the reference light;
detecting coherent light between the combined subject light and the reference light;
changing a path length difference between the reference light and the subject light and a relative position between the reference light and the subject light in a light receiving surface of a detection unit by an element arranged within a light path of the reference light or the subject light; and
causing a position of the optical element to be changeable;
independently adjusting the optical path length difference and the relative position by changing the position of the element;
projecting an image of a pattern of a mask onto a substrate; and
moving the substrate;
wherein a position of a surface of the substrate in an optical axis direction is adjusted using the substrate stage based on a measurement result,
wherein the element is movable in a first direction and a second direction vertical to the first direction, and
wherein, the relative position changes according to a change of the position of the element in the first direction and the optical path length difference changes according to the change of the position of the element in the second direction.

10. The method according to claim 9, further comprising arranging in a light path of each of the reference light and the subject light.

11. The method according to claim 9, further comprising:
dispersing interfering light of the combination of the subject light and the reference light by a spectroscope;
capturing light dispersed by the spectroscope; and
forming an image of the object on an incident slit of the spectroscope.

12. The method according to claim 11, further comprising:
causing the object to move; and
controlling the stage,
wherein the object is moved while one frame is captured by the capturing.

* * * * *